US007481710B2

(12) United States Patent
Kaminkow

(10) Patent No.: US 7,481,710 B2
(45) **Date of Patent: *Jan. 27, 2009**

(54) GAMING DEVICE HAVING A REPLICATING DISPLAY AND A PAYOUT DISPLAY

(75) Inventor: Joseph E. Kaminkow, Reno, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/856,706

(22) Filed: Sep. 17, 2007

(65) Prior Publication Data

US 2008/0058079 A1 Mar. 6, 2008

Related U.S. Application Data

(60) Continuation of application No. 11/114,425, filed on Apr. 25, 2005, which is a division of application No. 10/715,638, filed on Nov. 18, 2003, now Pat. No. 6,890,254, which is a continuation of application No. 09/629,606, filed on Jul. 31, 2000, now Pat. No. 6,695,696.

(51) Int. Cl.
*G06F 17/00* (2006.01)
*G06F 19/00* (2006.01)

(52) U.S. Cl. ............................ 463/31; 463/16; 463/20; 463/30; 463/46; 273/138.1

(58) Field of Classification Search .................. 463/16, 463/20, 30–31, 46; 273/138.1
See application file for complete search history.

(56) References Cited

U.S. PATENT DOCUMENTS 4,621,814 A 11/1986 Stepan et al.
4,695,053 A 9/1987 Vazquez, Jr. et al.
4,805,907 A 2/1989 Hagiwara (Continued)

FOREIGN PATENT DOCUMENTS

EP GB 558307 A2 9/1993

(Continued)

OTHER PUBLICATIONS

Totem Pole Advertisement written by IGT, published in 1997.

(Continued)

*Primary Examiner*—Robert Pezzuto
*Assistant Examiner*—Milap Shah
(74) *Attorney, Agent, or Firm*—Bell, Boyd & Lloyd LLP

(57) ABSTRACT

A gaming device that provides a second or replicating display that is an enlarged, preferably simulated replica of the actual display of the reels, paylines and indicia of the paystops of the gaming device. The second or replicating display can exactly recreate the actual rotation or random generation of the reels, represent the random generation of the reels, and do so by providing a slight delay. The present invention also contains a method by which the replicating display presents each of a plurality of award generating or winning paylines individually and sequentially for a predetermined amount of time before culminating in a display of the accumulated winning paylines. The method enables the player to easily see the source of an award, which would otherwise be difficult to discern from a multitude of paylines.

24 Claims, 11 Drawing Sheets

U.S. PATENT DOCUMENTS 4,838,552 A 6/1989 Hagiwara
5,088,737 A 2/1992 Frank et al.
5,342,047 A 8/1994 Heidel et al.
5,375,830 A 12/1994 Takemoto et al.
5,580,055 A 12/1996 Hagiwara
D392,340 S 3/1998 DeSimone
5,766,074 A 6/1998 Cannon et al.
5,772,509 A 6/1998 Weiss
5,807,172 A 9/1998 Piechowiak
5,882,105 A 3/1999 Barlow
5,902,184 A 5/1999 Bennett
5,911,418 A 6/1999 Adams
5,934,672 A 8/1999 Sines et al.
5,951,397 A 9/1999 Dickinson
D416,054 S 11/1999 McGahn et al.
5,976,016 A 11/1999 Moody et al.
5,980,384 A 11/1999 Barrie
5,984,781 A 11/1999 Sunaga
5,997,401 A 12/1999 Crawford
6,056,642 A 5/2000 Bennett
6,071,192 A 6/2000 Weiss
6,089,977 A 7/2000 Bennett
6,089,978 A 7/2000 Adams
6,093,102 A 7/2000 Bennett
6,105,962 A 8/2000 Malavazos et al.
6,120,378 A 9/2000 Moody et al.
6,126,165 A 10/2000 Sakamoto
6,135,884 A 10/2000 Hedrick et al.
6,142,874 A 11/2000 Kodachi et al.
6,159,095 A 12/2000 Frohm et al.
6,164,645 A * 12/2000 Weiss ...................... 273/138.2
6,358,147 B1 3/2002 Jaffe et al.
6,443,456 B1 9/2002 Gajor
6,695,696 B1 2/2004 Kaminkow

FOREIGN PATENT DOCUMENTS

WO WO 98/00207 1/1998

OTHER PUBLICATIONS

Dynamic Paytable Description written by IGT Australia, published prior to 2000.
Red Hot Roll Brochure (and Description) written by Barcrest Ltd., published prior to 2000.
Jackpot Party Brochures and Articles written by WMS Gaming, Inc., published in 1998.

* cited by examiner

GAMING DEVICE HAVING A REPLICATING DISPLAY AND A PAYOUT DISPLAY

PRIORITY CLAIM

This application is a continuation of, claims the benefit of and priority to U.S. patent application Ser. No. 11/114,425, filed on Apr. 25, 2005, which is a divisional of, claims the benefit of and priority to U.S. patent application Ser. No. 10/715,638, filed on Nov. 18, 2003, now U.S. Pat. No. 6,890, 254, which is a continuation of and claims the benefit of U.S. patent application Ser. No. 09/629,606 filed on Jul. 31, 2000, now U.S. Pat. No. 6,695,696 the entire contents of which are incorporated herein.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device with a video display that mirrors the random generation display mechanism of the gaming device and clarifies multi-payline machines having complex payout schemes.

BACKGROUND OF THE INVENTION

Gaming device manufactures have long provided gaming machines employing a plurality of reels, wherein the reels each have a plurality of symbols. In these games, the player "spins" a number of reels that act independently to produce a random generation of a combination of symbols. If the generated combination, or a portion of the combination, matches one of a number of predetermined award producing or winning combinations, the player receives an award.

To increase player enjoyment and excitement, and to increase the popularity of the gaming machines, gaming device manufacturers constantly strive to provide players with new types of gaming machines that attract the player and keep the player entertained. One proven way manufacturers use to make their machines more popular is to increase the number and variety of winning combinations and provide more opportunities for the player to win. Providing more variety and opportunities holds the player's interest for a longer time and also enables the manufacturer to have a larger range of payouts for the winning combinations. The larger range increases the size of the largest possible payout of the gaming device, and large payouts tend to attract players.

To increase variety and opportunity, manufacturers have increased the number of possible symbol positions or paystops. Increasing paystops increases the number of different symbols a game can have and increases the number of times a particular symbol can appear. Increasing the number of times that a symbol can appear increases its likelihood of appearance, which affects the payout of a winning combination containing that symbol. Winning combinations that have a rare or low likelihood of appearance tend to have higher payouts.

One way manufactures have increased the number of paystops has been to increase the size of the reel to accommodate more stops. Original gaming machines had approximately ten stops per reel, modern mechanical reels have approximately thirty to thirty five stops per reel and modern video machines have no physical limit to the number of stops per reel. Another way manufacturers have increased the number of paystops has been to add reels. Original gaming machines had three reels, while modern mechanical machines have employed up to five reels. Video reel machines have not increased the number of reels above five mainly because five reels create enough diversity to keep the game interesting without becoming too complex for the player to enjoy.

Another avenue that manufacturers have taken to provide more variety, opportunity, enjoyment and excitement has been to increase the number of paylines. Paylines are the sequence or line of paystops that the machine analyzes to determine if the player has won an award. The paylines in essence define the combination or group of paystops to be analyzed. Original gaming machines had only one payline. Modern machines sometimes called "line" machines have multiple paylines that contain a number of rows, lines or sequences of paystops that form combinations for the gaming device to analyze. The multiple rows, lines or sequences present multiple opportunities for the player to obtain a winning combination of symbols. Usually, players have to wager more to obtain the benefit of the multiple lines. Many games provide a bonus jackpot for playing the maximum number of coins and paylines, which means the player increases the payout values by playing all the paylines.

The line machines display multiple rows of paystops generated by each reel of the gaming device, wherein each row is a payline. Machines having at least three reels and displaying at least three rows of symbols create diagonal lines, wherein each diagonal line is also a payline. Machines having five reels and displaying at least three rows have many possible paylines, wherein the only criterion is that each paystop of a line or sequence must be adjacent to at least one other paystop of the line. Consequently, certain known gaming machines have up to nine different paylines, wherein a player can make up to nine different bets each time the player spins the reels.

It should be appreciated that gaming machines have become rather complex in comparison to the original three reel, ten stop machine created before 1900. At some point, adding variety yields diminished returns as the inevitable accompanying complexity of placing multiple bets and trying to keep tract of multiple winning combinations for each bet becomes too complex for the player. A player may win after a given spin of the reels and find it difficult to determine how, where or why the player has won. Mechanical reels, which are limited in drum radius, have limited space with which to display the multitude of symbols. Simulated reel displays are also limited in size to make room for other input devices and displays requiring panel space. The limited display space and viewing area furthers the complexity created by the multitude of paylines and winning combinations.

Therefore, a need exists to create a second, preferably larger display that follows or mirrors the display of the operation of the actual reels, which randomly generate different combinations of symbols. A need also exists to have such a second display parse or separate the paylines on which the player has won from the remainder of the paylines and symbols of said display. Such a display is preferably simulated so that it can show other necessary indicia and different successful paylines at different times.

SUMMARY OF THE INVENTION

The present invention involves a gaming device that provides a second or replicating display that is an enlarged, preferably simulated replica of the actual display of the reels, paylines and indicia of the paystops of the gaming device. The second or replicating display can exactly recreate the actual rotation or random generation of the reels or do so by providing a slight delay. The present invention also contains a method by which the replicating display presents each of a plurality of award generating or winning paylines individually and sequentially for a predetermined amount of time before culminating in a display of the accumulated winning paylines. The method enables the player to easily see the source of an award from a multitude of paylines, which would otherwise be difficult to discern.

In the replicating embodiment, the replicating display contains the same number of reels, the same number of paylines, the same number of paystops and the same indicia and order of indicia on the paystops as does the actual display or paystop display. The replicating display is preferably larger than the paystop display so that a player can easily see the action of the gaming device after setting the reels in motion, and so that the player can more easily discern the source of the player's award or success. The replicating display preferably exactly replicates, follows or shadows the rotation of the actual reels including the oscillation or overshoot created by the weight of mechanical reels coming to an abrupt stop.

In an alternative embodiment, the replicating display follows or is slightly behind the paystop display. The slight delay contemplated by the present invention provides an enjoyable and aesthetic effect for the player. The delay can be for any suitable time period but preferably is less than a second.

The replicating display can also contain indicia relating to a theme of the gaming device. Such indicia are preferably displayed in addition to the replicating of the paystop, however, the present invention can display the indicia in place of or instead of the replicating. At certain times, such as when no one is playing the gaming device, the mirroring device preferably displays the indicia video clips, or other entertainment relating to the theme of the device (as opposed to mirroring the idle symbols). Alternatively, the replicating display can display static and dynamic sequences, where in the indicia of said sequences have no relation to the theme of the gaming device. When nobody is playing the gaming device, the implementor may wish to display animations unrelated to the theme of the gaming device.

When the replicating device finishes displaying the random generation of the reels of the paystop display, the present invention preferably provides a method or sequence of displaying the player's awards in a serial fashion, such that the player can easily discern the source of the award. In a device wherein the player plays many paylines, e.g., nine at once, the present invention contemplates displaying each payline that generates an award individually and sequentially. At the end of the individual displays, the present invention displays an accumulation of all the award generating paylines in the replicating display.

The method of presenting award generating paylines enables the player to easily see the source of an award. The present invention preferably stops one payline display before beginning another, although the displays can overlap. Alternatively still, the replicating display can accumulate the award generating paylines one after another until they are all displayed at once. The payline displays preferably last from one to two seconds each, and each payline display can last for a different period of time. The present invention does not require that the paylines be presented in any order, however, the present invention preferably displays the paylines in the order that the gaming device presents the paylines to the player.

In addition, the present invention contemplates providing a backlighting system that highlights certain symbols of the reels at certain times. Lights disposed behind the reels are connected to the controller of the gaming device. The controller can selectively light one or more of the lights at various times. The present invention contemplates lighting the reels during the replicating portion of the game and dimming the reels during the winning payline display.

It is therefore an object of the present invention to provide a gaming device with a second, larger display that follows or mirrors the display of the operation of the actual reels so that the player may easily see the generation and outcome of a combination of reels.

Another object of the present invention is to provide a gaming device that can parse or separate the paylines on which the player has received an award from the remainder of the paylines and symbols of the reels and display the winning paylines to the player individually and in total.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
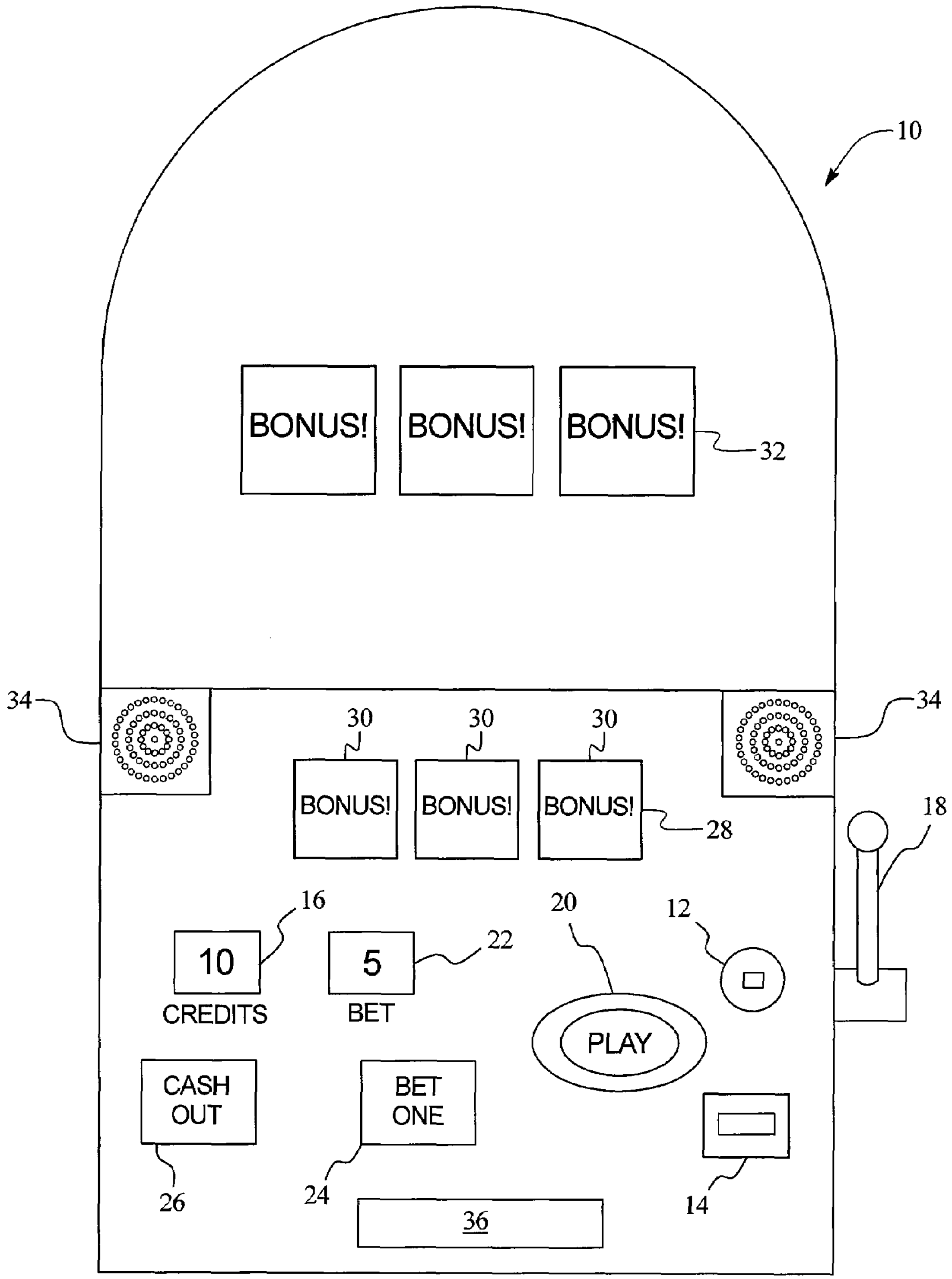
FIG. 1 is a front plan view of a general embodiment of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) that a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform. Gaming device 10 can incorporate any game such as slot, poker or keno. The symbols used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18, pushing play button 20. Play button 20 can be any play activator used by the player which starts any game or sequence of events in the gaming device.

Referring to FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a paystop display 28 which contains a plurality of reels 30, preferably three to five reels in mechanical or video form. Each reel 30 displays a plurality of symbols such as bells, hearts, martinis, fruits, cactuses, numbers, cigars, letters, bars or other images which preferably correspond to a theme associated with the gaming device 10. If the reels 30 are in video form, the gaming device 10 preferably displays the video reels 30 in a video monitor described below. Furthermore, gaming device 10 preferably includes speakers 34 for making sounds or playing music.

At any time during the game, a player may "cash out" and thereby receive a number of coins corresponding to the number of remaining credits by pushing a cash out button 26. When the player "cashes out," the player receives the coins in a coin payout tray 36. The gaming device 10 may employ other payout mechanisms such as credit slips redeemable by a cashier or electronically recordable cards which keep track of the player's credits.

With respect to electronics, the controller of gaming device 10 preferably includes the electronic configuration generally illustrated in FIG. 2, which has: a processor 38; a memory device 40 for storing program code or other data; a video monitor 32 (i.e., a liquid crystal display) described in detail below; a plurality of speakers 34; and at least one input device as indicated by block 33. The memory device 40 can include random access memory (RAM) 42 for storing event data or other data generated or used during a particular game. The memory device 40 can also include read only memory (ROM) 44 for storing program code which controls the gaming device 10 so that it plays a particular game in accordance with applicable game rules and pay tables.

The processor 38 is preferably a microprocessor or microcontroller-based platform which is capable of displaying images, symbols and other indicia such as images of people, characters, places, things and faces of cards. Although not shown, gaming device 10 can provide a second, slave processor, with which the processor 38 can communicate through a suitable protocol. The gaming device 10 can employ the processor 38 to tell or command the slave processor to perform certain functions, such as to display certain images on the display.

Figure 2:
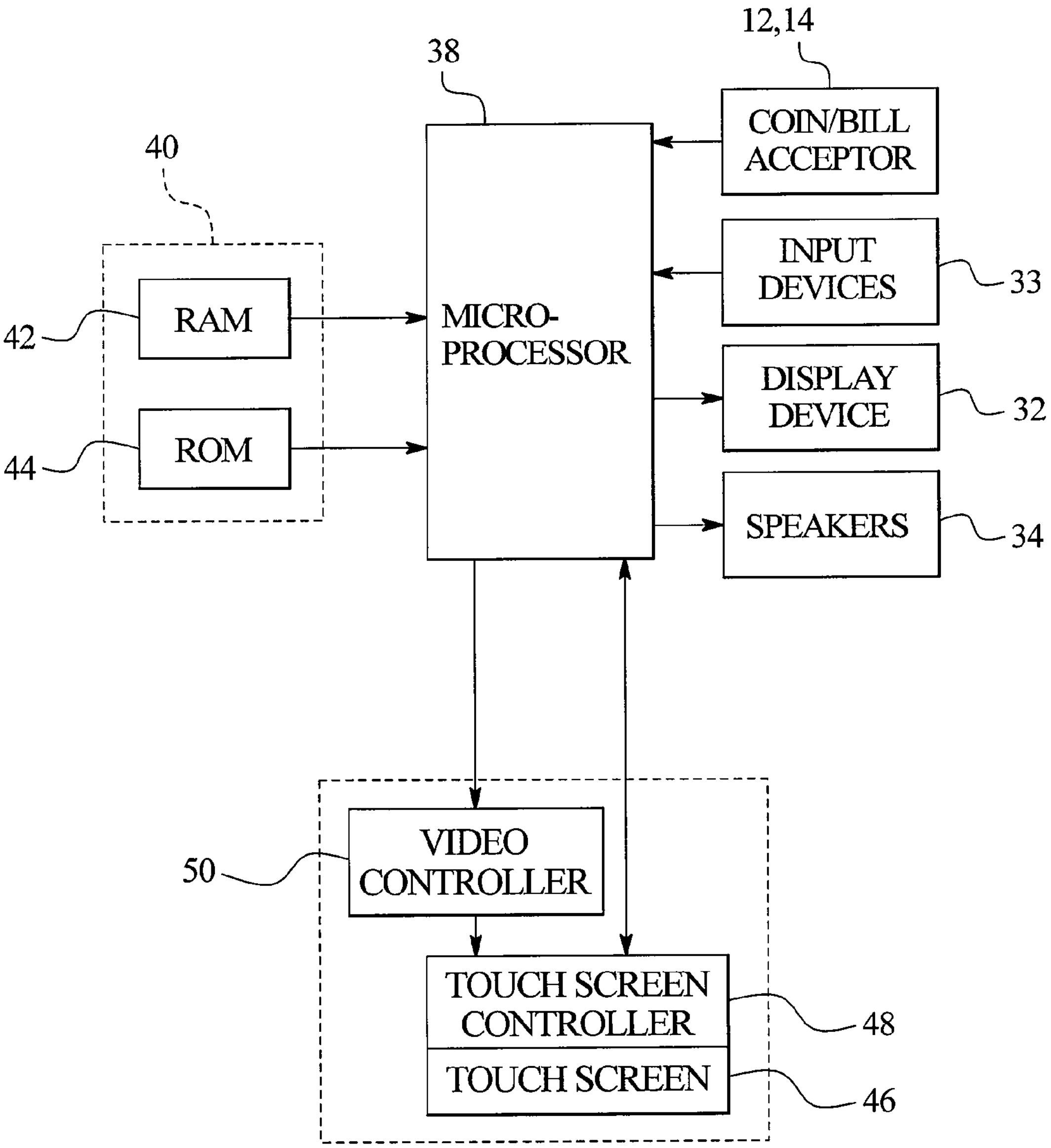
FIG. 2 is a schematic block diagram of the electronic configuration of one embodiment of the gaming device of the present invention.

As illustrated in FIG. 2, the player preferably uses the input devices 33, such as the arm 18, play button 20, the bet one button 24 and the cash out button 26 to input signals into gaming device 10. In certain instances, a touch screen 46 and an associated touch screen controller 48 can be used in conjunction with a video monitor described in detail below. Touch screen 46 and touch screen controller 48 are connected to a video controller 50 and processor 38. A player can make decisions and input signals into the gaming device 10 by touching touch screen 46 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. For purposes of describing the invention, the controller includes the processor 38 and memory device 40.

Referring to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

Replicating Display

Referring still to FIG. 1, the present invention of the gaming device 10 is embodied in video monitor 32. For the purposes of this invention, the video monitor 32 will hereafter be referred to as the replicating device or display. It should be appreciated that the word replicating encompasses mirroring, shadowing and following as well as replicating. The replicating display can be any known video monitor, television screen, dot matrix display, CRT, LED, LCD or electro-luminescent display. The replicating display 32 can be color or monochrome although, preferably, the display is color. The replicating display 32 is preferably separate from the paystop display 28 containing the reels 30, even if the paystop display 28 and the reels 30 are in video or simulated form. However, it should be appreciated that the present invention contemplates a single display having the contents of both the paystop display 28 and the replicating display 32.

Figure 3A:
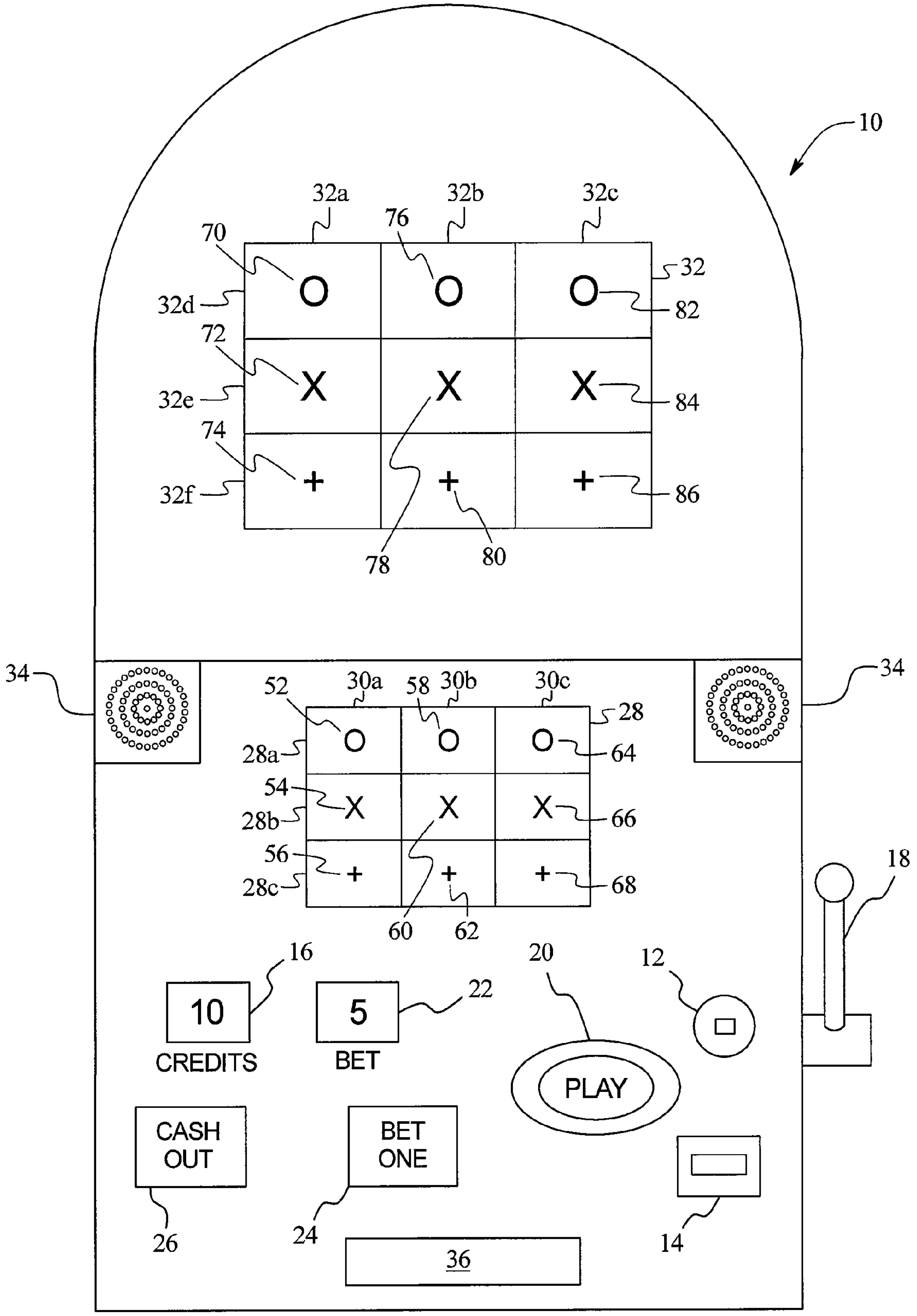
FIG. 3A is a front plan view of one embodiment of the gaming device of the present invention having a second display replicating the random generation of symbols from a first display.

Referring to FIG. 3A, one embodiment of the gaming device of the present invention has a paystop display 28 and a replicating display 32 as described above. The paystop display 28 contains three reels 30*a*, 30*b*, and 30*c*. As described above, the reels 30 can be mechanical or simulated, however, the present invention preferably provides mechanical reels 30. The present invention can have any number of reels and is not limited to the three shown in the embodiment of FIG. 3A. The paystop display 28 also contains the three paylines 28*a*, 28*b* and 28*c*. The present invention can have any number of paylines, but preferably, the present invention contains three paylines as shown.

The paystop display 28 thus displays nine paystops as they would appear after a player has spun the reels, i.e., played the gaming device. Three of the plurality of paystops of reel 30*a* wound up or stopped in paystop display 28, namely, the paystops 52, 54 and 56. Three of the plurality of paystops of reel 30*b* wound up or stopped in paystop display 28, namely, the paystops 58, 60 and 62. Likewise, three of the plurality of paystops of reel 30*c* wound up or stopped in paystop display 28, namely, the paystops 64, 66 and 68.

Based on the paystop display, the replicating display 32 contains three reels. The reels of the replicating display are preferably simulated and contained in a video monitor. In certain instances, the video monitor can contain a touch screen 46 that is connected to a touch screen controller 48 (FIG. 2). The replicating display 32 preferably contains the same number of reels as does the paystop display 28. Therefore, the replicating display 32 contains the three reels 32*a*, 32*b* and 32*c*. The replicating display also preferably contains the same number of paylines as does the paystop display 28 and therefore contains the three paylines 32*d*, 32*e* and 32*f*.

The replicating display 32 therefore preferably contains the same number of paystops as does the paystop display 28. The replicating display has nine paystops, again, as they would appear after a player has spun the reels, i.e., played the gaming device. Three of the plurality of paystops of simulated reel 32*a* wound up or stopped in the replicating display 32, namely, the paystops 70, 72 and 74. Three of the plurality of paystops of reel 32*b* wound up or stopped in the replicating display, namely, the paystops 76, 78 and 80. Likewise, three of the plurality of paystops of reel 32*c* wound up or stopped in the replicating display, namely, the paystops 82, 84 and 86.

The indicia or symbols contained on the paystops of both displays are the same. That is, the indicia or symbols of paystops 52, 54, 56, 58, 60, 62, 64, and 66 are the same as the indicia or symbols of paystops 70, 72, 74, 76, 78, 80, 82, 84 and 86, respectively. For example, both the paystops 52 and 70 display the "O" indicia, both the paystops 78 and 60 display the "X" indicia and both the paystops 86 and 68 display the "+" indicia. It should be appreciated that all the indicia or symbols of the entire reels 30*a*, 30*b* and 30*c*, and those not shown in the paystop display 28, are the same as all the indicia or symbols of the entire reels 32*a*, 32*b* and 32*c* of the replicating display 32, respectively. Although shown only figuratively in FIG. 3A, the paystops of the replicating display 32 are significantly larger and preferably 25% larger than the paystops of the paystop display 28.

In one embodiment of the present invention, the invention contemplates the reels and associated paystops of the replicating display 32 constantly replicating, mirroring, shadowing, or otherwise displaying the same indicia or symbols as the respective reels and associated paystops of the paystop display 28. The mirroring or shadowing occurs whether or not the paystops of the displays are in motion. It is well known for the gaming device of the present invention and it adds much to the excitement and enjoyment, by way of anticipation, for the gaming device to show, the reels spin and the symbols or indicia of the reels blur and become indiscernible to the human eye before stopping to decide the player's fate. With mechanical reels, the indicia show the overshoot and resonance of the reels as they abruptly come to a full stop. The present invention contemplates the simulated reels of the replicating display 32 mirroring or shadowing the resonance effects.

The present invention also contemplates the replicating display 32 mirroring or shadowing different reels of the paystop display 28 stopping at different times. It is well known in the art for the reels of a slot machine to stop at different times. In most instances, the stopping of reels occurs from left to right. That is, the reel furthest to the left stops first, then the reel to the right of the first, etc. until each reel stops. The present invention preferably stops reels of the replication display 32 in the exact same order that the paystop display 28 employs.

The present method contemplates different methods of mirroring the paystop display 28, one of which is through the use of more than one processor. The preferred method is through two processors, one master and one slave, which communicate through a protocol, which is well known in the art. In this method, the master processor 38 tells or commands the slave processor to display certain images in each location on the replicating display 32.

Figure 3B:
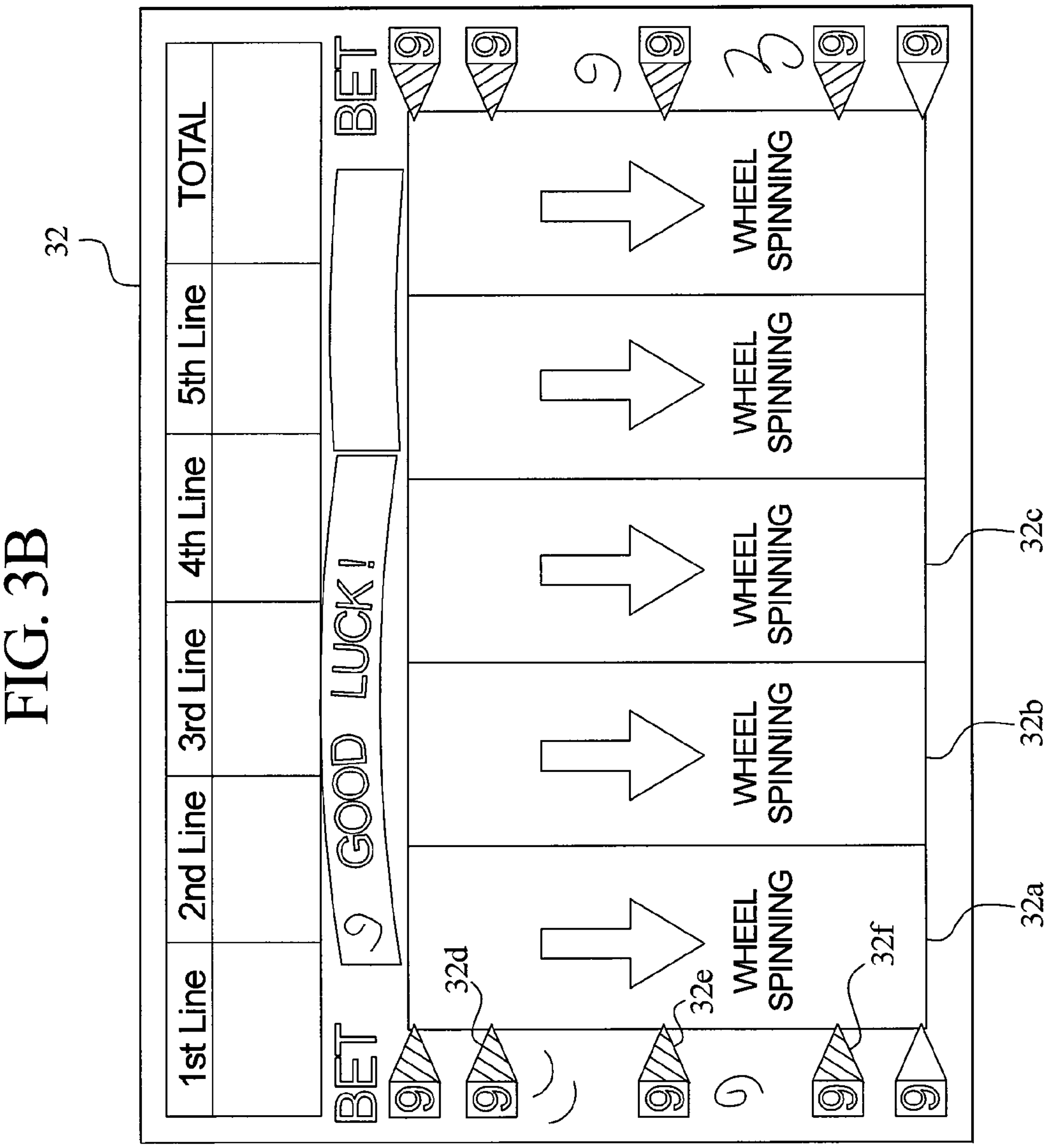
FIG. 3B is a front plan view of another embodiment of the gaming device of the present invention having a second replicating display that merely represents said generation of symbols of said first display.

Referring now to FIG. 3B, an alternative embodiment of the replicating display is shown wherein the symbols of the replicating display 32 represent the spinning of the reels 30 of the display device 28. That is, instead of producing an exact replication of said spinning reels as discussed FIG. 3A, the embodiment of FIG. 3B represents motion by blurring or warping the simulated reels 32*a*, 32*b* and 32*c* of the replicating display 32. When the actual reels 30*a*, 30*b* and 30*c* of the display device 28 come to a stop individually or simultaneously, the corresponding reels of the replicating display 32*a*, 32*b* and 32*c*, likewise stop blurring or warping or otherwise representing motion. The representation in the replicating display 32 of the present invention preferably uses the same colors in the same proportion as do the symbols of the reels 30 of the display device 28. For instance, if the reels of the display device contain a large proportion of yellow lemons and orange oranges, the replicating display contains the same proportion of yellow and orange in the blurred or warped representation of the spinning reels.

Figure 4:
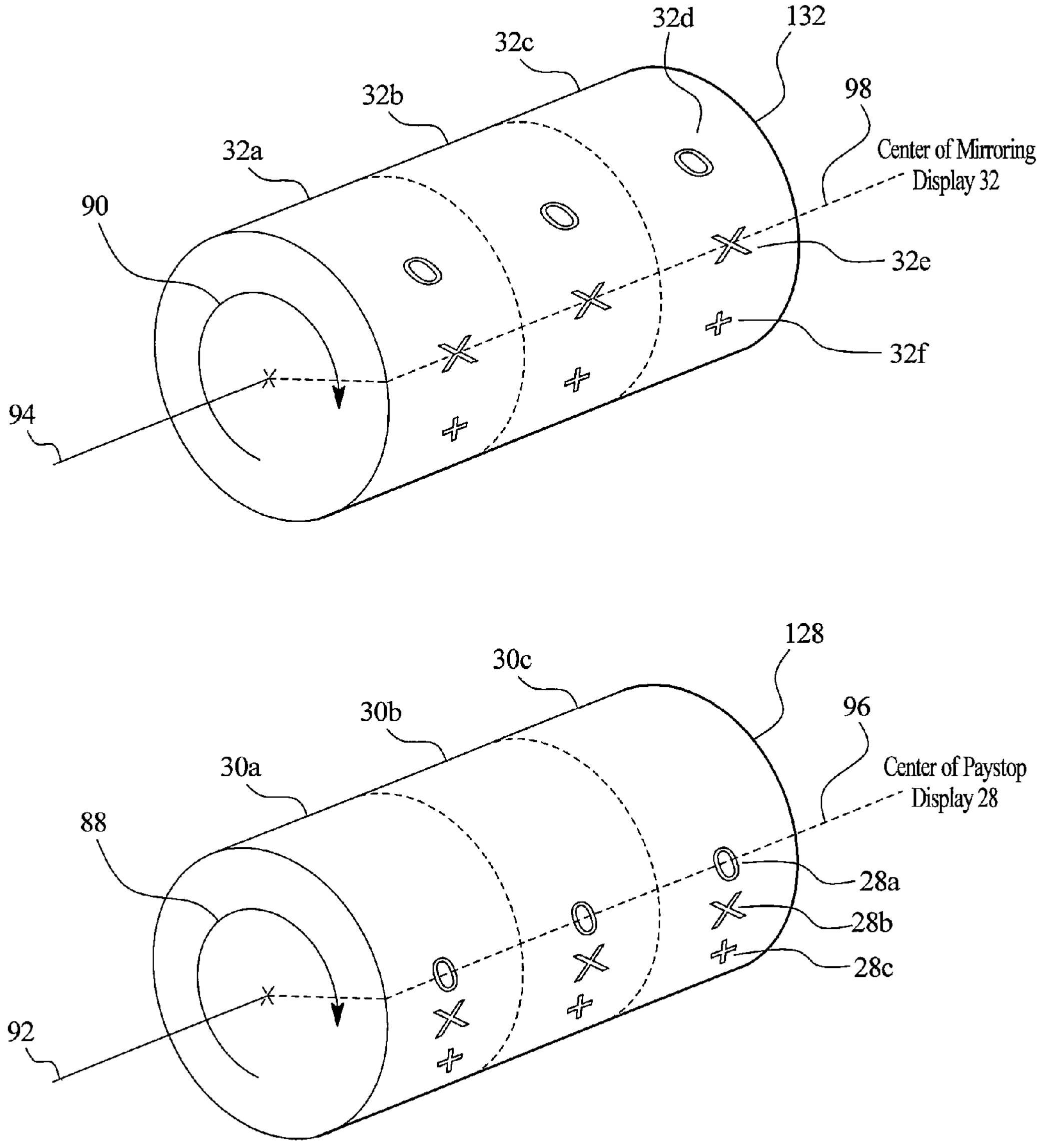
FIG. 4 is a perspective view of a representation of two reels of the present invention that have indicia, which illustrate the delay aspect of the present invention.

Referring to FIG. 4, the present invention contemplates another embodiment in which the replicating display 32 follows or is slightly behind the paystop display 28. That is, there exists a predetermined delay between the display of a particular image on the paystop display 28 and that same image on the replicating display 32, wherein the same image occurs at a later time on the replicating display. FIG. 4 illustrates two rotating drums 128 and 132 that contain the same indicia as do the displays 28 and 32 in FIG. 3A, respectively, although, for the ease of illustration, only the corresponding reel symbols are provided, not the identifying reel symbol numbers.

The rotating paystop drum 128 contains the reels 30*a*, 30*b* and 30*c* as shown in FIG. 3A as well as the paylines 28*a*, 28*b* and 28*c*. Likewise, the rotating replicating drum 132 contains the reels 32*a*, 32*b* and 32*c* as shown in FIG. 3A as well as the paylines 32*d*, 32*e* and 32*f*. The rotating drums 128 and 132 have arrows 88 and 90, respectively, that show a clockwise rotational direction about the drum centerlines 92 and 94.

It should be appreciated that in FIG. 3A, the "X", "X", "X" symbols of the paystop display 28 appear in the center of the display. The identical "X", "X", "X" symbols of the replicating display 32 also appear in the middle of the device. However, the embodiment of FIG. 4 illustrates that the "X", "X", "X" symbols of the drum 128 have already rotated past the paystop centerline 96 while the "X", "X", "X" symbols of the drum 132 are currently rotating past the replicating centerline 98. This illustration demonstrates the delay in the embodiment of the present invention. That is, the paystop drum 128 currently illustrates the "0", "0", "0" symbols rotating past the paystop centerline 96, while the corresponding "0", "0", "0" symbols of the replicating drum 132 will not rotate past the replicating centerline 98 for a predetermined period of time.

The delay embodiment of FIG. 4 contemplates any time delay. The visual effect of the delay is appealing to the player and heightens player excitement and enjoyment. The present invention preferably provides a time delay in the range of 0.2 seconds to 1.0 second. It should be appreciated that except for the delay, the replicating display otherwise replicates the paystop display 28 as illustrated in FIGS. 3A and 3B. That is, the displays contain the same number of reels and paylines, the reels contain the same number of paystops and the paystops display or represent the same symbols or indicia in the same order.

Figure 5:
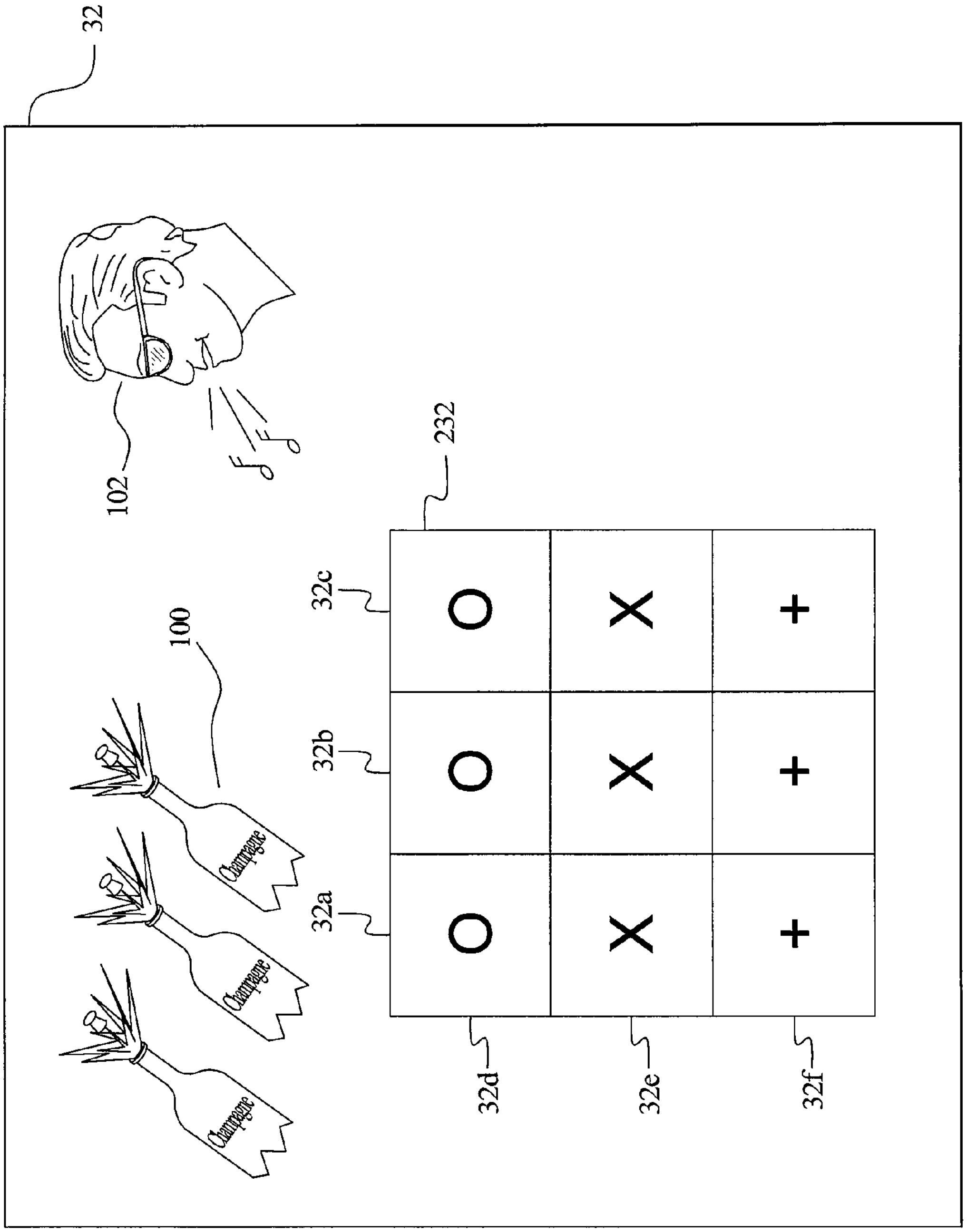
FIG. 5 is an enlarged front plan view of one embodiment of the replicating display of the present invention having additional indicia.

Referring to FIG. 5, the replicating display 32 can have additional indicia or substitute indicia besides a display of the reels of the gaming device. The additional or substitute indicia preferably relate to a theme of the gaming device and add excitement and enjoyment to its operation. The indicia are preferably in addition to the replicating display. For example, FIG. 5 illustrates the replicating display 32 containing a display 232 of the reels 32*a* through 32*c* and the paylines 32*d* through 32*f*, as described above, as well as additional indicia such as the popping champagne bottles 100 and the singing celebrity 102. The champagne bottles and celebrity are preferably part of a theme of the gaming device, which can highlight, signal or embellish a gaming device event such as a large award or payout.

While the reels of the gaming device 10 are inactive, e.g., no player is currently operating the device or the player is taking a brief respite, the replicating display 32 can shut down or discontinue the display 232 of the reels until a player resumes action (not shown). It should be appreciated that in such periods of inactivity, the gaming device is better served by having the entire replicating display presenting indicia relating to the theme of the gaming device.

Alternatively, the replicating display can display static and dynamic sequences, wherein the indicia of the sequences have no relation to the theme of the gaming device. It should be appreciated in periods of inactivity, the gaming device preferably displays indicia that attracts players. Such indicia can relate to a game theme. The indicia can also relate to any theme or event that attracts players. The present invention therefore contemplates displaying additional attractive indicia unrelated to the game theme.

Paylines in Series

Referring to FIGS. 6A through 6J, one embodiment of the present invention contemplates providing a display of any payline that the player has bet or played, and which has obtained or received an award generating or winning combination of symbols after the random generation of the reels (hereafter referred to as a "winning" payline). Paylines are well known visible or invisible lines superimposed upon the paystop display of a gaming device, which the game uses to analyze a player's spin of the reels. FIGS. 6A through 6J all contain a replicating display 32 of the present invention having five reels, 32*g* to 32*k*, and three paylines, 32*l* to 32*n*. Known gaming devices having such a configuration can and do have up to twenty-five different paylines, however nine is preferred.

Figure 6A:
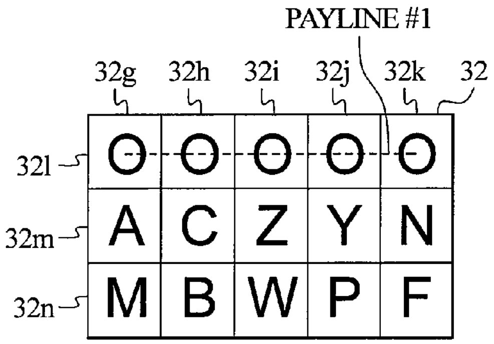
FIG. 6A is a representation of a display of the reels of the present invention, which illustrates one payline of the present invention.
Figure 6B:
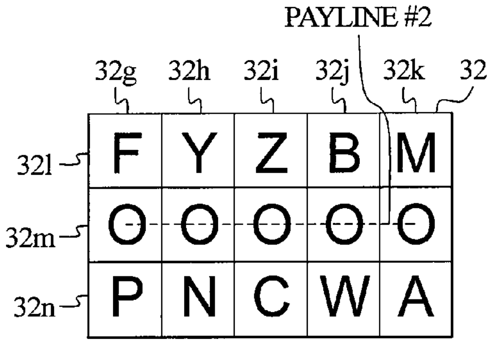
FIG. 6B is a representation of a display of the reels of the present invention, which illustrates another payline of the present invention.
Figure 6C:
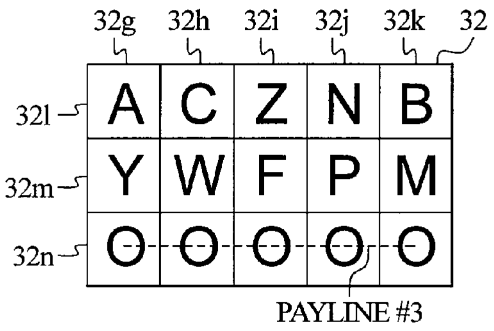
FIG. 6C is a representation of a display of the reels of the present invention, which illustrates a further payline of the present invention.
Figure 6D:
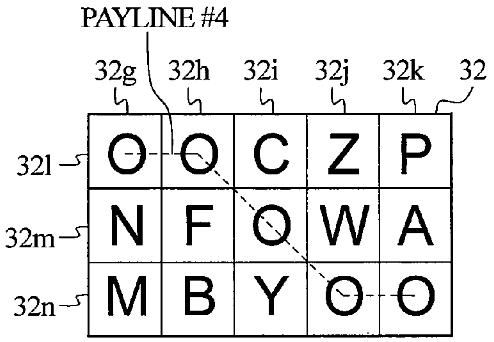
FIG. 6D is a representation of a display of the reels of the present invention, which illustrates still another payline of the present invention.
Figure 6E:
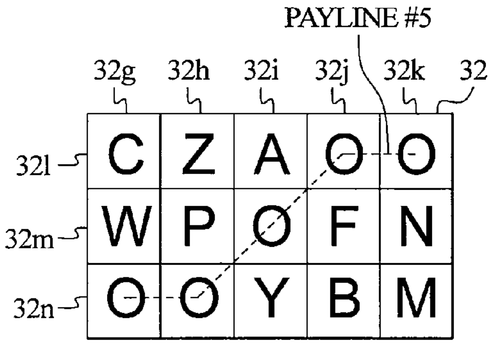
FIG. 6E is a representation of a display of the reels of the present invention, which illustrates a still further payline of the present invention.
Figure 6F:
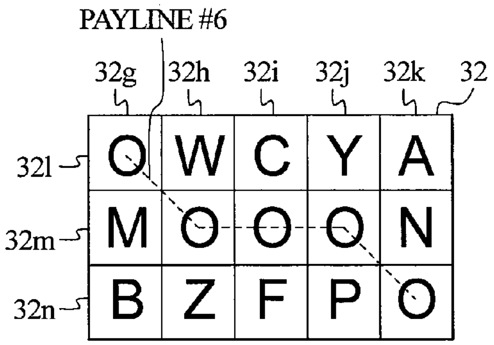
FIG. 6F is a representation of a display of the reels of the present invention, which illustrates yet another payline of the present invention.
Figure 6G:
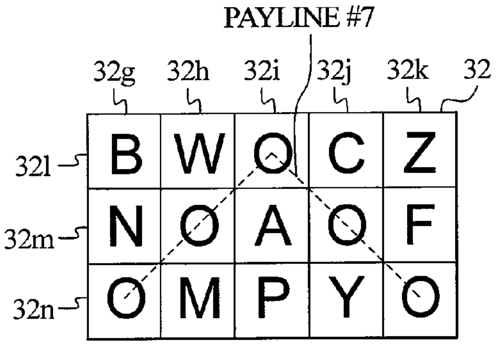
FIG. 6G is a representation of a display of the reels of the present invention, which illustrates yet a further payline of the present invention.
Figure 6H:
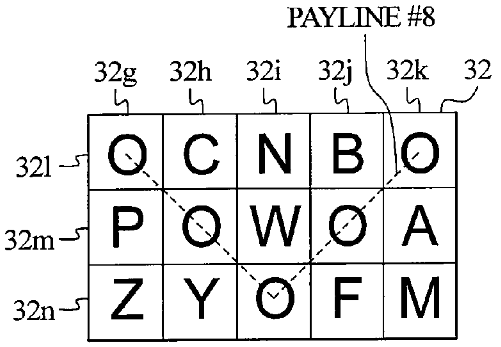
FIG. 6H is a representation of a display of the reels of the present invention, which illustrates again another payline of the present invention.
Figure 6I:
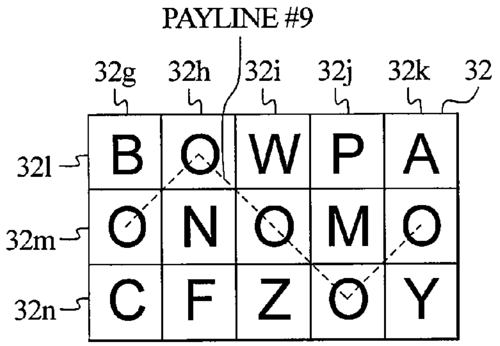
FIG. 6I is a representation of a display of the reels of the present invention, which illustrates again a further payline of the present invention.
Figure 6J:
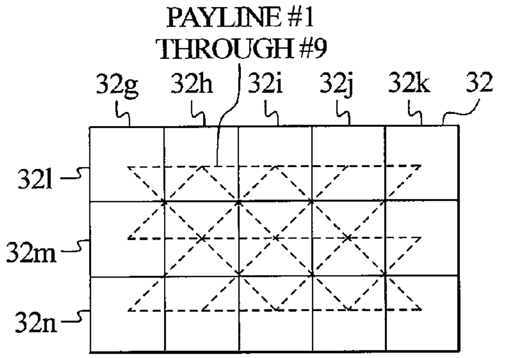
FIG. 6J is a representation of a display of the reels of the present invention, which illustrates the accumulation of paylines of 6A through 6I, in a single display.

FIGS. 6A, 6B and 6C illustrate the paylines #1, #2 and #3, respectively, wherein the "O", "O", "O", "O" and "O" combination comprises a winning combination amongst other random symbols. FIGS. 6D, 6E and 6F illustrate diagonal paylines #4, #5 and #6, respectively, wherein the five "O"'s comprise a winning combination amongst other random symbols. FIGS. 6G and 6H illustrate triangular paylines #7 and #8, respectively with the winning "O" symbols. FIG. 6I illustrates a serpentine payline #9 having the winning "O" symbols. As can be readily seen from these figures, each payline has five adjacent paystops. It should be appreciated that the present invention can include other sets of five adjacent paystops and is not limited to the ones shown in FIGS. 6A through 6I. FIG. 6J illustrates the integration or accumulation of each of the illustrated paylines.

A player playing all nine paylines of a gaming device having only a paystop display such as the display 28 must analyze each of the nine paylines to determine which ones have yielded an award. Players are generally curious as to how they have won or succeeded at a gaming device and also desire to assure themselves that the gaming device has provided an award when it is due and has done so in the correct amount. The present invention provides a method by which the player can easily discern the award generating paylines.

After the display 32 of the present invention mirrors the rotation of the reels of the paystop display 28, the present invention preferably displays each winning payline alone, separately and in series before displaying an accumulation of each of the winning paylines at once. As illustrated by FIGS. 6A through 6I, the replicating display 32 contains both a line and the symbols on or below the line. It is well known in the art to superimpose a line over the reels, preferably on a glass or clear plastic cover protecting the reels, so that the player can discern the paylines when making bets. The replicating display can also contain a piece of glass or clear plastic having the superimposed paylines. The replicating display can itself create and maintain the paylines before, during and after the display of the spinning reels.

In the present method, the player bets or plays any number of paylines, spins the reels and receives an award. The present invention then displays a first winning payline for a predetermined period of time and ends the display, displays a second winning payline for a predetermined period of time and ends the display and displays each winning payline in this manner before finally displaying all the winning displays at once.

Figure 6K:
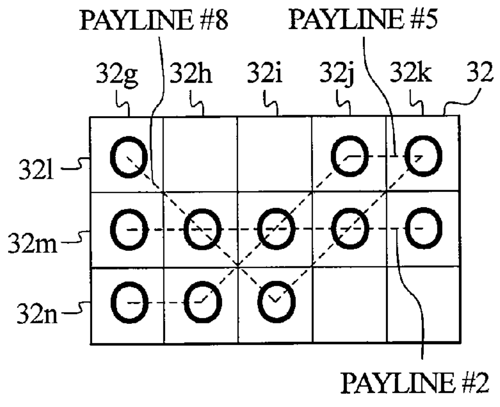
FIG. 6K is a representation of a final display of the payline method of the present invention, wherein three winning paylines are collectively displayed.

Referring to FIGS. 1 and 6A through 6J, the player, for example, bets or plays each payline #1 through #9 in FIGS. 6A though 6I, respectively. The player then spins the reels 30 by pulling the arm 18 or pressing the button 20. The reels generate symbols in all fifteen paystops of the displays in FIG. 6, while the present invention mirrors the generation. The player wins on three paylines, namely, payline #2 of FIG. 6B, payline #5 of FIG. 6E and payline #8 of FIG. 6H. The replicating display 32 of the present invention displays only the payline #2 of FIG. 6B for three seconds, then the payline #5 (FIG. 6E) for three seconds, then the payline #8 (FIG. 6H) for three seconds and finally the display of FIG. 6K showing all three paylines, i.e., winning combinations, at once for a predetermined period of time.

The payline method of the present invention preferably stops the display of one winning payline before beginning the display of another, so that each display is separate and easily discernable. Each winning payline can be displayed for any suitable amount of time, preferably from one to two seconds, and each may be displayed for a different period of time. The present invention does not require that the paylines be presented in any order, however, the present invention preferably displays the paylines in the order that the gaming device presents the paylines to the player. That is, the game displays the paylines in the order in which the player chooses to play or not to play a particular payline.

The payline method alternatively contemplates an overlap of the payline displays, or further, the accumulation of winning paylines as opposed to the serial fashion of the preferred embodiment. The present invention may present a first winning payline, add a second winning payline while still displaying the first, add a third and so on until all the winning paylines are presented at once as is done at the end of the preferred embodiment in FIG. 6K.

The method of the present invention preferably works in conjunction with the replicating function of the replicating display 32. That is, the replicating display 32 preferably mirrors the spinning reels and outcome of the paystop display 28 and then produces the winning paylines in the serial fashion described above. It should be appreciated that the payline display must contain the same number of reels, paylines, paystops and order of indicia as the paystop display 28 to properly present the winning paylines, which are sections or components of the paystop display. The method also includes providing displays having indicia related or unrelated to the theme (described above), which attracts players when the game is idle and while the game is presenting an award to a player. This additional or substitute indicia therefore does not include a display of the paylines or of award winning symbols of said paylines.

Figure 6L:
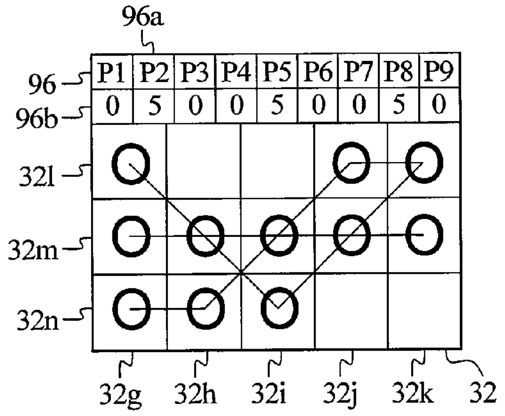
FIG. 6L is a representation of a final display of the payline method of the present invention illustrating an alternative embodiment wherein the display contains the payout for each winning payline.

Referring to FIG. 6L, an alternative embodiment of the payline method of the present invention is illustrated, wherein the replicating display 32 contains a table or organization of the payouts for each payline. FIG. 6L contains the same winning paylines as illustrated in FIG. 6K, namely, paylines #2, #5 and #8 for FIGS. 6A through 6J. FIG. 6L also contains a table or organization 96 having a representative 96*a* of each payline and a number 96*b*, wherein the number represents the award for the payline from the most recent spin of the reels. The representation of each payline 96*a* preferably contains identifying indicia, such as the "P1" and "P2" shown in FIG. 6L or "1st LINE" and "2nd LINE" as desired by the implementor. The number 96*b* is preferably placed close to the identifying indicia so that the player can easily connect the payline and the amount.

Figure 7:
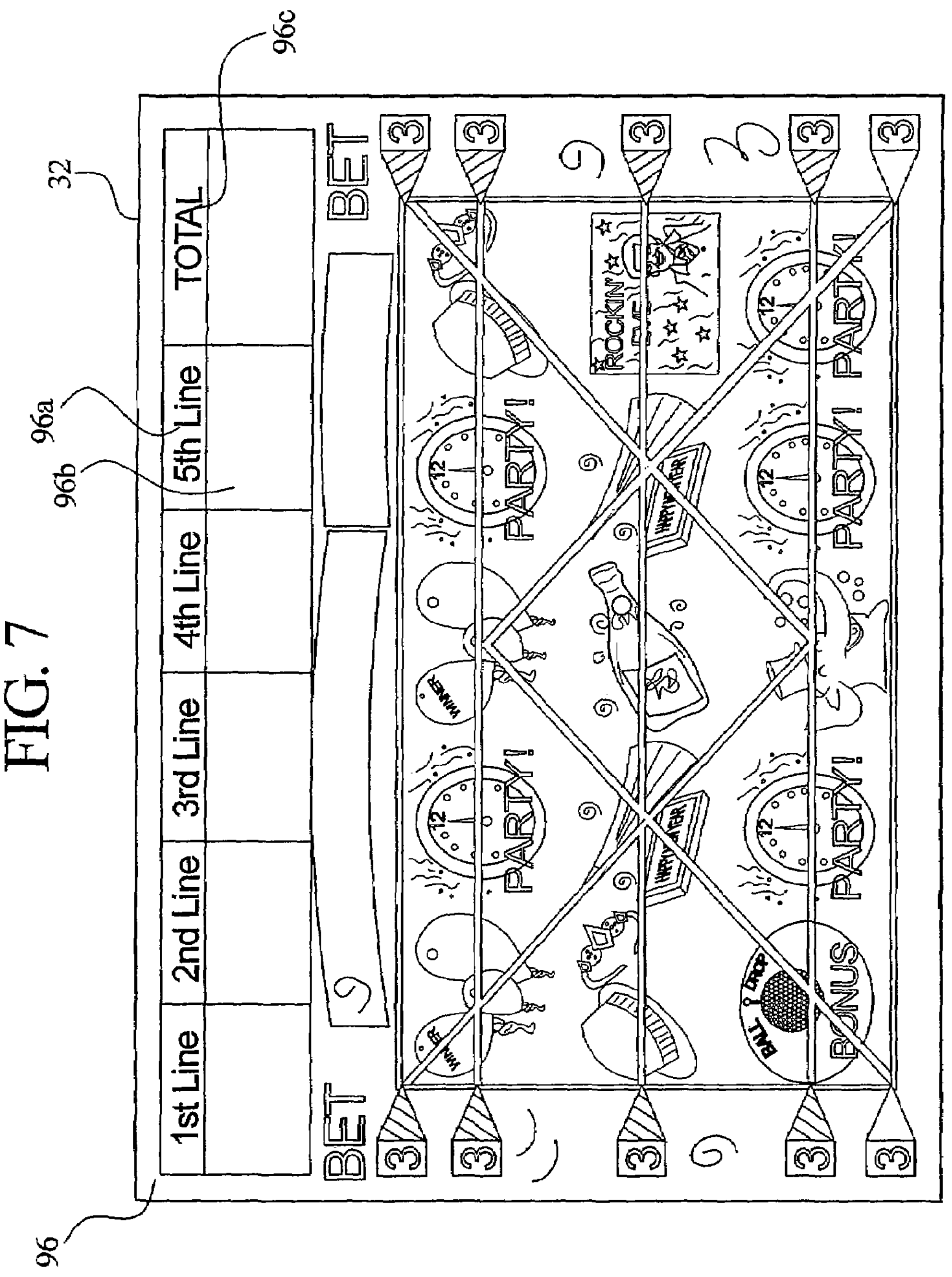
FIG. 7 is an enlarged front plan view of one embodiment of the replicating display of the present invention having a payout table that includes a display of the total payout.

Referring to FIG. 7, a replicating display 32 of the present invention is shown containing the pay chart, table or organization 96 of payouts from each payline having a representative 96*a* of each payline, a payout number display 96*b* and, additionally, a total payout display 96*c* at the end of table 96. It should be appreciated that the organization or table 96 containing the total payout display 96*c* can be horizontally configured, as shown, vertically configured, or configured in any manner in relation to the replicating display 32 as desired by the implementor. The implementor can place the organization on table 96 having a total payout display 96*c* along the top edge (as shown), bottom edge, left edge or right edge of the replicating display 32 as desired.

The table 96 can display the payout numbers 96*b* as the replicating display 32 sequences through each payline or do so only at the end when the game displays the accumulation of winning paylines. The game can accumulate the payout number displays 96*b* as they are sequentially displayed or display them separately and sequentially before the accumulated display. The display can place zeros in the payout number displays 96*b* that the player does not bet or place another suitable symbol or no symbol in the payout number displays 96*b* for each inactive, unplayed payline.

Figure 8:
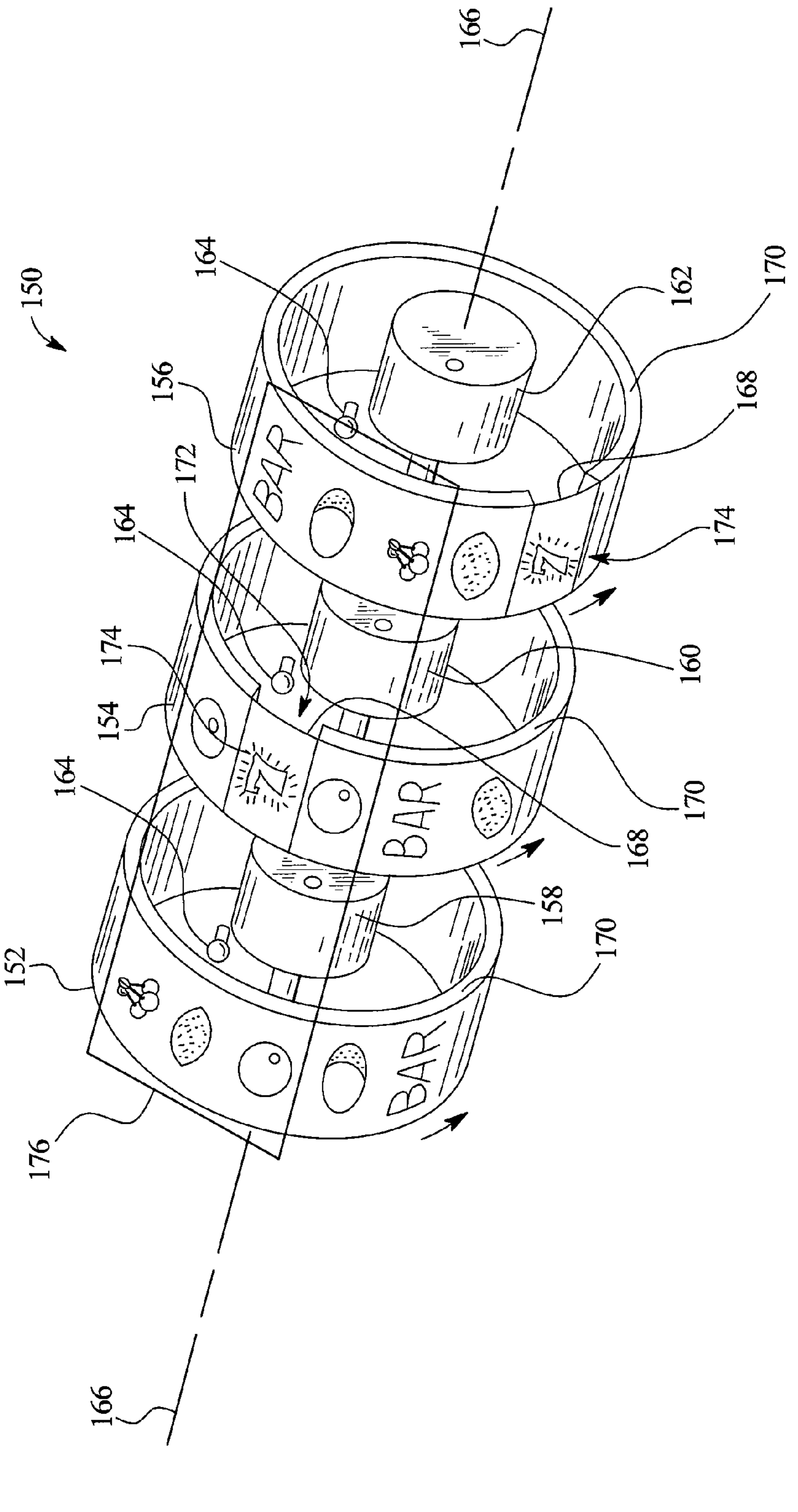
FIG. 8 is a perspective view of a plurality of reels of the gaming device having means on the inside of said reels to selectively illuminate said symbols.
Figure 9:
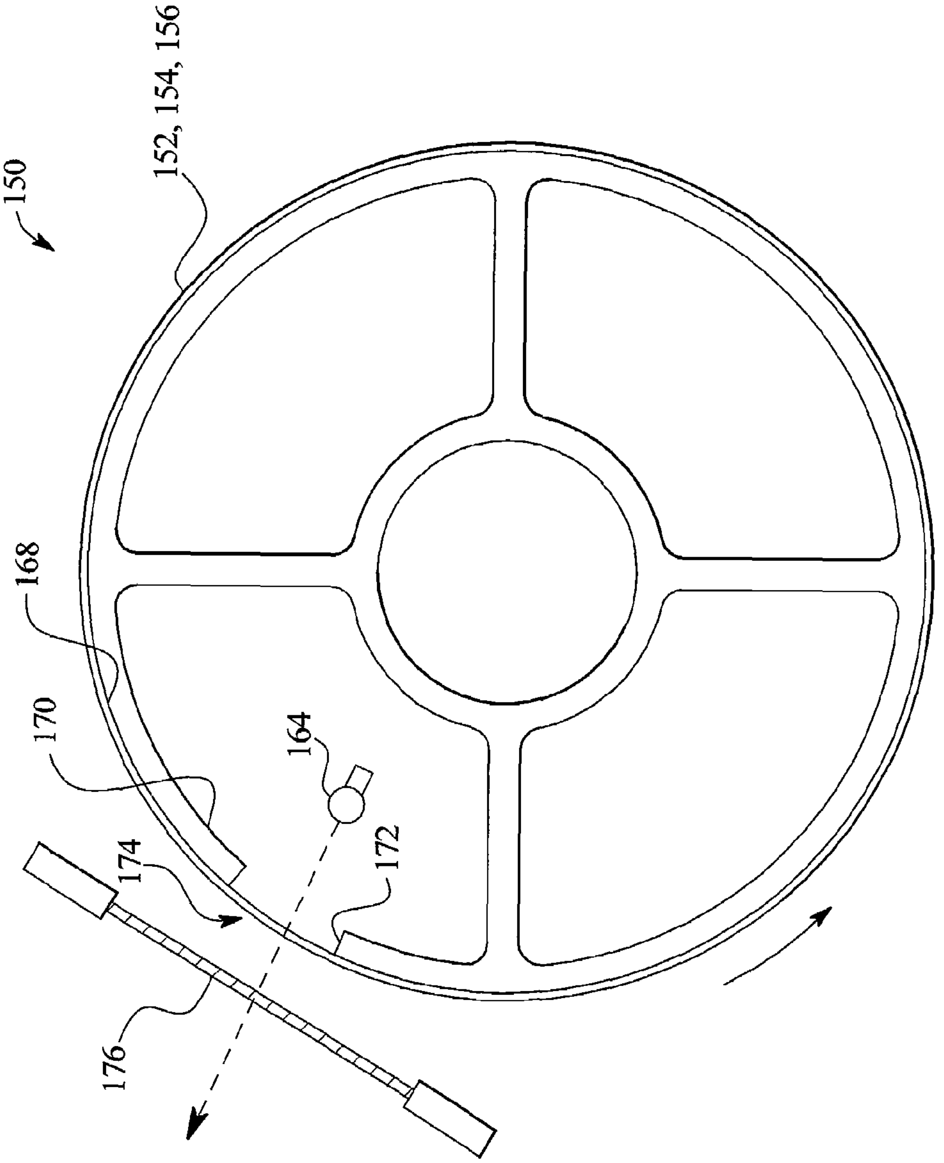
FIG. 9 is a side view of a plurality of reels of the gaming device having means on the inside of said reels to selectively illuminate said symbols.

Referring now to FIGS. 8 and 9, an alternative embodiment of the present invention is illustrated, wherein the reels 30 of the gaming device contain lights between the axis of rotation of the reels and the symbols of the reels. The lights enable the implementor of the gaming device to selectively illuminate one or more of the reels. Lighting symbols, commonly referred to in the art as backlighting, is well known. The gaming device can backlight certain symbols such as award generating symbols. Alternatively, the gaming device can backlight a plurality of symbols. The present invention preferably backlights all the symbols as the reels spin, while the replicating display 32 replicates the generation of symbols.

When the present invention stops spinning the reels 30 of the display device 28 and displays the winning paylines on the replicating display 32, the present invention preferably turns off the backlights, except for backlights lighting a winning payline, to highlight the payline display. This is, after the reels having stopped spinning, the present invention preferably leaves a winning payline lit but turns off all other backlights. The present invention can alternatively turn off all the backlights to highlight the payline display.

Referring to FIG. 8, a perspective view of one example of a backlighting system 150 is shown having the reels 152, 154 and 156. The reels are driven and positioned by individual stepper motors 158, 160 and 162. Each reel has an associated light 164 disposed between a centerline 166 of said reels and the outer reel tape 168, which contains the symbols. In this embodiment, the outer reel tape 168 adheres to and circumscribes a masking member 170. The masking members 170 contain openings 172 that enable the backlights 164 to illuminate special symbols 174. The lights 164 are positioned so that illuminated special symbols 174 can be viewed from a window 176 that covers the display device 28.

Referring to FIG. 9, a side view of one example of a backlighting system 150 is shown having a reel such as the reels 152, 154 or 156. FIG. 9 illustrates the positioning of the light 164 in relation to an opening 172 in a reel masking member 170 which supports the reel tape 168 having special symbols 174. The light 164 illuminates the special symbol 174 so that a person playing the gaming device can see the illumination through the viewing window 176. This example illustrates how the gaming device can selectively illuminate one or more symbols. It should be appreciated that by providing many openings 172, the gaming device can illuminate many or all of the symbols. The gaming device can also turn the light 164 on and off to selectively illuminate or darken the display device 28.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming system comprising:

at least one input device;

a first mechanical display device, said first mechanical display device configured to display a plurality of symbols of a game;

a second display device;

at least one processor; and at least one memory device which stores a plurality of instructions, which when executed by the at least one processor, cause the at least one processor to operate with the at least one input device, the first mechanical display device and the second display device to control a play of the game by:

(a) causing the first mechanical display device to move;

(b) substantially simultaneous with the rotation of the first mechanical display device, causing the second display device to display at least one animated image substantially replicating said movement of the symbols displayed by said first mechanical display device;

(c) causing the first mechanical display device to stop moving to indicate at least one of said symbols; and (d) regardless of any symbols indicated by the first mechanical display device in any previous plays of the game and substantially simultaneous with the stopping of the first mechanical display device, causing the second display device to display at least one animated image substantially replicating said first mechanical display device indicating said at least one of said symbols.

2. The gaming system of claim 1, wherein the first mechanical display device is a spinning symbol generator.

3. The gaming system of claim 1, wherein when executed by the at least one processor, the instructions cause the at least one processor to control the play of the game by causing the first mechanical display device to rotate if a triggering event occurs.

4. The gaming system of claim 3, wherein said triggering event is a player placing a wager on said game.

5. The gaming system of claim 1, wherein said movement of the symbols displayed by said first mechanical display device is a rotation of the symbols displayed by said first mechanical display device.

6. The gaming system of claim 1, wherein when executed by the at least one processor, the instructions cause the at least one processor to control the play of the game by causing the first mechanical display device to stop rotating to indicate a plurality of said symbols and causing the second display device to display at least one animated image substantially replicating said first mechanical display device indicating said plurality of said symbols.

7. The gaming system of claim 1, wherein the first mechanical display device is at least one reel.

8. The gaming system of claim 1, wherein the at least one processor resides remote from a housing which supports said first mechanical display device and said at least one input device.

9. A gaming system comprising:

at least one input device;

a plurality of different display mediums, each display medium configured to display a play of a game which includes a plurality of symbols, wherein a first one of the display mediums is a mechanical display device;

at least one processor; and at least one memory device which stores a plurality of instructions, which when executed by the at least one processor, cause the at least one processor to operate with the at least one input device and said plurality of different display mediums to control the play of the game by:

(a) causing the first one of the display mediums to display a movement of said plurality of symbols;

(b) substantially simultaneous with the displayed movement of said plurality of symbols, causing a second one of the display mediums to display at least one animated image substantially replicating said movement of the symbols displayed by said first of the display mediums;

(c) causing the first of the display mediums to stop displaying said movement of said symbols to display at least one of said plurality of symbols; and (d) regardless of any symbols displayed by the first of the display mediums in any previous plays of the game, causing the second of the display mediums to display at least one animated image substantially replicating: (i) the stopping of the displayed movement of said symbols and (ii) said at least one of said plurality of symbols displayed by the first of the display mediums.

10. The gaming system of claim 9, wherein when executed by the at least one processor, the instructions cause the at least one processor to control the play of the game by causing the first one of the display mediums to display the movement of said plurality of symbols if a triggering event occurs.

11. The gaming system of claim 10, wherein said triggering event is a player placing a wager on said game.

12. The gaming system of claim 9, wherein the at least one processor resides remote from a housing which supports said first one of the mediums and said at least one input device.

13. A method of operating a gaming system, said method comprising:

(a) causing a first mechanical display device to move, said first mechanical display device configured to display a plurality of symbols of a game;

(b) substantially simultaneous with the rotation of the first mechanical display device, causing a second display device to display at least one animated image substantially replicating said movement of the symbols displayed by said first mechanical display device;

(c) causing the first mechanical display device to stop moving to indicate at least one of said symbols; and (d) regardless of any symbols indicated by the first mechanical display device in any previous plays of the game and substantially simultaneous with the stopping of the first mechanical display device, causing the second display device to display at least one animated image substantially replicating said first mechanical display device indicating said at least one of said symbols.

14. The method of claim 13, which includes causing the first mechanical display device to rotate if a triggering event occurs.

15. The method of claim 14, wherein said triggering event is a player placing a wager on said game.

16. The method of claim 13, which includes causing the first mechanical display device to stop rotating to indicate a plurality of said symbols and causing the second display device to display at least one animated image substantially replicating said first mechanical display device indicating said plurality of said symbols.

17. The method of claim 13, wherein said movement of the symbols displayed by said first mechanical display device is a rotation of the symbols displayed by said first mechanical display device.

18. The method of claim 13, which is controlled through a data network.

19. The method of claim 18, wherein the data network includes an internet.

20. A method of operating a gaming system, said method comprising:

(a) causing a first one of a plurality of different display mediums to display a movement of a plurality of symbols for a play of a game, wherein the first one of the display mediums is a mechanical display device;

(b) substantially simultaneous with the displayed movement of said plurality of symbols, causing a second one of the plurality of display mediums to display at least one animated image substantially replicating said movement of the symbols displayed by said first of the display mediums;

(c) causing the first of the display mediums to stop displaying said movement of said symbols to display at least one of said plurality of symbols; and (d) regardless of any symbols generated by the first of the display mediums in any previous plays of the game, causing the second of the display mediums to display at least one animated image substantially replicating: (i) the stopping of the displayed movement of said symbols and (ii) said at least one of said plurality of symbols displayed by the first of the display mediums.

21. The method of claim 20, which includes causing the first one of the display mediums to display the movement of said plurality of symbols if a triggering event occurs.

22. The method of claim 21, wherein said triggering event is a player placing a wager on said game.

23. The method of claim 20, which is controlled through a data network.

24. The method of claim 23, wherein the data network includes an internet.

* * * * *